Oct. 11, 1932.    R. H. MAURER    1,881,807
REMOTE HEAT CONTROL MECHANISM
Filed Nov. 25, 1927
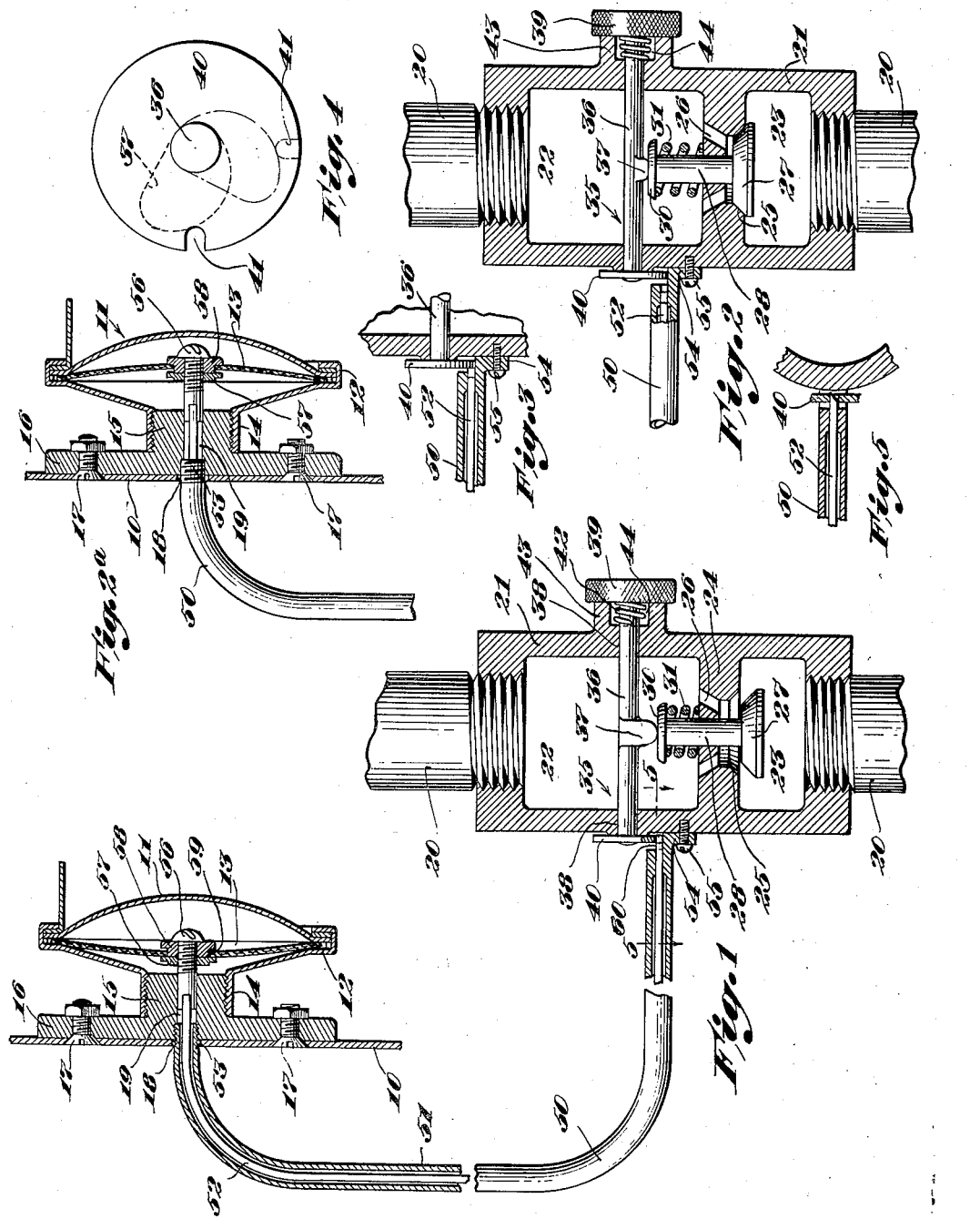
Inventor
Rufus H. Maurer
by Roberts Cushman & Woodbury
Attys.

Patented Oct. 11, 1932

1,881,807

UNITED STATES PATENT OFFICE

RUFUS H. MAURER, OF BROOKLINE, MASSACHUSETTS, ASSIGNOR TO SPENCER THERMOSTAT COMPANY, OF CAMBRIDGE, MASSACHUSETTS, A CORPORATION OF MASSACHUSETTS

REMOTE HEAT CONTROL MECHANISM

Application filed November 25, 1927. Serial No. 235,437.

This invention relates to means for controlling the temperature of a chamber by which means the device heating the chamber is rendered inoperative when a predetermined temperature is reached or passed. One embodiment of mechanism for accomplishing this object in accordance with this invention comprises a thermostat subjected to the heat emitted from the heating device, means normally cutting off the supply of fuel to the heating device, and means controlled by said thermostat which prevent the operation of such cutting off means until a certain predetermined temperature has been passed and which then permit such action of the cutting off means.

Other objects will be in part obvious and in part pointed out hereinafter.

The invention accordingly comprises the elements and combinations of elements, features of construction, and arrangements of parts which will be exemplified in the structure hereinafter described, and the scope of the application of which will be indicated in the following claims.

In the accompanying drawing, in which is illustrated one of the various possible embodiments of the invention.

Fig. 1 is a view partly in cross section disclosing the thermostat located in the chamber, the means for cutting off the supply of fuel to the heating device and the means by which the cutting off means is controlled by the thermostat, the parts being shown in the position in which the fuel is being supplied and before the predetermined temperature has been passed;

Figs. 2 and 2ª together constitute a view similar to Fig. 1 showing parts in the position which they will occupy just after the predetermined temperature has been passed and the fuel supply has been cut off;

Fig. 3 is a detail view showing the position of certain elements when the supply valve is closed and the chamber is below the predetermined temperature;

Fig. 4 is an elevational view of a plate which constitutes one element of this invention; and Fig. 5 is a sectional view taken along the line 5—5 of Fig. 1.

Similar reference characters indicate corresponding parts throughout the several views of the drawing.

In the drawing is shown a wall 10 of a chamber which is to be heated by any suitable heating device. Mounted upon the wall 10 is a thermostat 11 comprising a housing 12 and a thermostatic member 13, preferably an arched disk, enclosed within the housing. The thermostat here shown is similar to that disclosed in Spencer Patent No. 1,448,240, dated March 13, 1923, and the disk 13 will, under the influence of the change in temperature, shift from the position shown in Fig. 1 to the position shown in Fig. 2ª or vice versa.

The housing 12 includes an internally threaded sleeve 14 which engages a boss 15 on a plate 16 suitably secured to the inner face of the wall 10, as, for example, by means of nuts and bolts 17. Through the wall 10 is formed an aperture 18 with which a passage 19 through the plate 16 and boss 15 registers.

The heating device of the present embodiment is supplied with gas or other similar fuel by means of a line 20 which includes a valve casing 21 (see Figs. 1 and 2). The valve casing 21 comprises an upper compartment 22 and a lower compartment 23 separated by a partition 24. In the lower face of the partition 24 is formed a valve seat 25 the base of which is connected to the upper compartment 22 by a plurality of passages 26. A valve 27 adapted to engage the valve seat 25 and control the passages 26 is mounted upon a stem 28 adapted to reciprocate in an aperture 29 through the partition 24. The valve stem 28 has a head 30 which is held at all times in contact with a valve actuator, to be described later. The valve 27 is normally held in the seat 25 (see Fig. 2) by means of a spring 31 surrounding the valve stem 28 and bearing against the upper face of the partition 24 and the lower face of the head 30. When the valve is opened (see Fig. 1) the fuel through the line 20 enters the compartment 23, flows through the valve seat 25 and the passages 26 into the compartment 22 and thence to the heating device. It will be noted that the valve 27 is normally closed to cut off the supply of fuel through the line 20.

For the purpose of opening the valve 27 an actuator 35 is provided, which actuator includes a shaft 36 having at its center a cam 37, adapted, as the shaft is turned, to engage the head 30 of the valve and either open it, as shown in Fig. 1, or else permit it to close, as shown in Fig. 2. The shaft 36 extends through apertures 38 in the walls of the casing 21 across the compartment 22, and at one end is provided with a knurled knob 39 by which it can be turned manually. At the other end of the shaft 36 is fixed a disk 40 having a notch 41 in its periphery. The disk 40 is secured to the shaft 36 in such a position that, when the cam 37 engages the head 30 of the valve 27 to depress the stem 28 and open the valve the desired amount, the notch 41 will be at the bottom, as indicated in dotted lines on Fig. 4. A coil spring 42 is provided to hold the shaft 36 normally in the inoperative position shown in Figs. 2 and 4. The wall of the casing 21, through which the end of the shaft bearing the knob 39 passes, may be provided with a boss 43 having a pocket 44 which surrounds the shaft and within which the spring is enclosed.

The thermostat 11 is connected to the valve casing 21 by means of a Bowden wire 50 which, as is well known, comprises a flexible sheath 51 and a wire 52. By means of this construction a longitudinal impulse applied to one end of the wire 52 will be transmitted to the other end, even though it be necessary that the sheath 51 be bent at various angles. One end of the sheath 51 is externally threaded at 53 to engage the wall of the passage 19 through the plate 16; the other end of the sheath is provided with a flange 54 which is fastened to the wall of the casing 21 by means of a screw 55 and located directly below the disk 40, as is clearly shown in the drawing. The wire 52 is fixed at one end to a bolt 56 which is secured to flanged collars 57 mounted at the center of the thermostat disk 13. The collars 57 joined in an aperture 58 in the disk 13 by the threads of the bolt 56 provide an annular groove 59 which receives the edges of the disk 13 so that the movement of the disk is transmitted to the bolt 56 and thence to the wire 52. The lower end 60 of the wire 52 rests on the flange 54 and projects into contact with the disk 40 of the actuator 35 when the disk 13 of the thermostat is in the position shown in Figure 1. If the actuator 35 is turned into the operative position to open the valve 27, the end 60 of the wire 52 will enter the notch 41 of the disk and prevent the actuator from returning to its normal inoperative position. Since the actuator is thus held in the operative position it must follow that the valve 27 is kept open.

With the parts in the position shown in Fig. 1 fuel is being supplied to the heating device. When the temperature passes the predetermined point, the disk 13 snaps from the position of Fig. 1 into the position of Fig. 2ª carrying the bolt 56 with it and retracting the wire 52. The end 60 of the wire is thus withdrawn from the slot 41 and the actuator is free to respond to the urge of the spring 42, returning to its normal position, freeing the valve 27 and allowing its closure by the spring 31, thus cutting off the supply of fuel to the heating device. As soon as the temperature in the chamber passes the same or somewhat different predetermined point in the reverse direction, the disk 13 will, of course, return to the position of Fig. 1, advancing the wire 52. If the actuator 35 is not in valve-open position, the tip 60 will simply bear against the outer face of the disk 40, as shown in Fig. 3. The internal diameter of the sheath is greater than the diameter of the wire 52 so that, when the advance of the wire 52 is prevented by the disk 40, the wire can shift in the sheath 51 and the excess length can be taken up without interfering in any way with the thermostat 11. The tip 60 of the wire is preferably beveled, as shown in the drawing, so that if it is desired for any reason to cut off the supply of fuel before the predetermined temperature is reached, the disk 40 can be shifted by manually turning the knob 39, the beveled face 61 of the tip 60 being engaged by the edge of the notch 41 and the wire 52 forced back out of the notch (see Figs. 3 and 5).

The actuator 35 and the Bowden wire 50 together comprise thermostat controlled means by which the valve 27 is held against closing or is permitted to close. The spring 42 on the shaft 36 is light and not of itself strong enough to move the plate 40 past the tip 60 of the wire 52. By adjusting the position of the plate 40 on the shaft 36 the amount the valve 27 is opened by the cam 37 can be regulated.

One of the uses to which this invention is particularly applicable is to shut off the gas when a burner is extinguished. For example, in a gas range it is desirable to shut off the gas when a burner blows out or is otherwise accidentally extinguished as by a temporary failure of the gas pressure. For such use the thermostat 11 is placed in heat-transfer relation to the burner flame and is arranged to hold the valve open when the thermostat is in hot position. That is the disk 13 is so placed in the casing that it snaps to the left (Fig. 1) when heated and to the right (Fig. 2ª) when cooled. When so positioned the valve is permitted to close when the thermostat snaps from hot to cold position. In lighting the burner it is then necessary to hold the valve open for a moment until the burner flame has heated the disk sufficiently to snap it into hot position, whereupon the wire 52 holds the valve open until the burner is extinguished.

Another use to which this invention is applicable is to cut off the supply of fuel when a chamber heated thereby passes a predetermined temperature and thus to perevent overheating thereof. When so used the thermostat 11 is placed in the chamber being heated and is so arranged that the disk 13 will take the position of Figure 1 until the predetermined temperature is passed. When that takes place the disk snaps into the position of Figure 2ª retracting the wire 52 and permitting the valve 27 to close cutting off the supply of fuel to the burner.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

I claim:

1. A heat control mechanism whereby the supply of fuel, to the device by which the heat to be controlled is created, is cut off when a predetermined temperature is passed, comprising a thermostat responsive to and subjected to the heat, a fuel supply line, a valve in said line normally closed to cut off the supply of fuel to said device, a shaft, a cam on said shaft which, when said shaft is rotated, will open said valve, means for holding said shaft normally in the inoperative position, a Bowden wire secured at one end to said thermostat and adapted to be advanced when said thermostat is in the relatively cold position and retracted when said thermostat is in the hot position, said wire engaging said shaft, when it is rotated into the position to open said valve, to hold it in such position and being retracted by said thermostat when the predetermined temperature is passed to release said shaft permitting it to return to its normal position and permitting said valve to close and cut off the supply of fuel.

2. A cupped bimetallic disk adapted to snap back and forth in response to temperature variations, a flexible wire engaging the center of said disk and adapted to be moved by said disk and a valve adapted to be operated by actuation of said flexible wire.

3. A thermostatically controlled valve comprising a cupped bimetallic disk adapted to snap back and forth in response to heat strains, a valve, means tending to keep said valve in one position and means comprising a notched member and a Bowden wire control operatively connecting said disk to said notched member for holding the valve in another position and adapted to automatically release said valve to permit same to change its position.

4. A thermostatically controlled valve comprising a cupped bimetallic disk adapted to snap back and forth in response to heat strains, a valve, means tending to keep said valve normally in one position, means for forcing the valve into another position and a Bowden wire control operatively connecting said disk to said last named means, said Bowden wire control being adapted to keep said last named means operative in one position of the disk and being adapted to release and render said means inoperative in another position of the disk.

5. A thermostatically controlled valve comprising a cupped bimetallic disk adapted to snap back and forth in response to heat strains, a valve, means tending to keep said valve normally in one position, manual means for forcing said valve into another position and a Bowden wire control connecting said disk with said manual means, said wire control being adapted to render said manual means inoperative in one position of the disk and to keep it operative in another position of the disk.

6. A thermostatically controlled valve comprising a cupped bimetallic disk adapted to snap back and forth in response to heat strains, a valve, means tending to keep said valve normally in one position, manually operable means adapted to force said valve into another position, a Bowden wire control operatively connecting said disk and said manually operable means, and a slotted member on said manually operable means adapted to be engaged by the end of said wire whereby said manually operable means is retained in operative position for one position of the disk, and to be disengaged from the said end whereby the said manually operable means is rendered inoperative for the other position of the disk.

7. A thermostatically controlled valve comprising a cupped bimetallic disk adapted to snap back and forth suddenly, a valve, means tending to keep said valve normally in one position, means adapted to force said valve into another position, a Bowden wire control connecting said disk and said last named means whereby said last named means is adapted to be retained in operative position in one position of the disk and be released and moved to inoperative position in the other position of the disk and manual means for changing said last named means from one position to the other.

8. A thermostatically controlled valve comprising a cupped bimetallic disk, a housing therefor, a valve, means tending to keep said valve normally in one position, an actuator adapted to force said valve to another position, means tending to retain said actuator in inoperative position, a slotted member on one end of said actuator and a knob on the other end of said actuator and a Bowden wire control operatively connecting said disk and said slotted member whereby in one position of the disk, said actuator is adapted to be retained in operative position and in the other position of the disk, said actuator is permitted to assume its inoperative position.

9. A thermostatically controlled valve comprising a cupped bimetallic disk, a valve, means tending to keep said valve normally in one position, an actuator adapted to force said valve to another position, means tending to keep said actuator normally inoperative, a slotted member on one end of said actuator, a knob on the other end of said actuator and a Bowden wire control operatively connecting said disk and said slotted member, the end of said wire at the slotted member being beveled whereby in one position of the disk, the valve is adapted to be retained in one position and in the other position of the disk, the slotted member is released permitting the valve member to be retained in its other position, and said valve being adapted to be adjusted to either position by said knob irrespective of the position of said disk.

Signed by me at Cambridge, Massachusetts, this 16th day of November 1927.

RUFUS H. MAURER.